(12) United States Patent
Giamatti et al.

(10) Patent No.: US 12,514,228 B2
(45) Date of Patent: Jan. 6, 2026

(54) APPARATUS FOR ANIMAL TRAINING, REHABILITATION, AND RECREATION

(71) Applicants: Deborah S. Giamatti, Big Pine Key, FL (US); Nicholas J. Giamatti, Big Pine Key, FL (US)

(72) Inventors: Deborah S. Giamatti, Big Pine Key, FL (US); Nicholas J. Giamatti, Big Pine Key, FL (US)

(*) Notice: Subject to any disclaimer, the term of this patent is extended or adjusted under 35 U.S.C. 154(b) by 64 days.

(21) Appl. No.: 18/663,476

(22) Filed: May 14, 2024

(65) Prior Publication Data

US 2024/0397912 A1    Dec. 5, 2024

Related U.S. Application Data

(60) Provisional application No. 63/505,751, filed on Jun. 2, 2023.

(51) Int. Cl.
*A01K 15/02*    (2006.01)

(52) U.S. Cl.
CPC .................................. *A01K 15/02* (2013.01)

(58) Field of Classification Search
CPC ................. A01K 15/02; A01K 15/027; A63B 2022/0092; A63B 2022/0094; A63B 22/00; A63B 22/14; A63B 22/16; A63B 22/18; A63B 22/20; A63B 22/201; A63B 5/00; A63B 5/08; A63B 5/11; A63B 5/16; A63B 6/00; A63B 6/02
See application file for complete search history.

(56) References Cited

U.S. PATENT DOCUMENTS

| | | | | |
|---|---|---|---|---|
| 3,475,020 | A * | 10/1969 | Schauerte | A63B 22/16 482/146 |
| 5,820,478 | A * | 10/1998 | Wood | A63B 69/3652 473/279 |
| 2012/0208684 | A1 * | 8/2012 | Huang | A61H 23/0254 482/146 |
| 2014/0287896 | A1 * | 9/2014 | Kern | A63B 26/003 482/147 |
| 2015/0251049 | A1 * | 9/2015 | Kolvenbach | A63B 21/4033 482/146 |
| 2016/0303422 | A1 * | 10/2016 | Douglass | A63B 21/4033 |
| 2019/0282878 | A1 * | 9/2019 | Gouzenko | A63B 26/003 |

* cited by examiner

*Primary Examiner* — Garrett K Atkinson

(57) ABSTRACT

An apparatus for animal training, rehabilitation, and/or recreation. The apparatus includes a platform suspended by a plurality of suspension members originating from the platform, extending up to the Apparatus' suspension towers. The animal, such as a dog, can stand on the suspended platform for exercise or therapy. The directly reactive movement & pendulum oscillation of the platform from the subject animals' movements, can be dampened, controlled as needed by oscillation dampers that impart elastic resistance to movement of the platform. The oscillation dampers can be coupled to the proximal end and the distal end of the platform.

11 Claims, 6 Drawing Sheets

APPARATUS FOR ANIMAL TRAINING, REHABILITATION, AND RECREATION

CROSS-REFERENCE TO RELATED APPLICATIONS

This application claims priority from a U.S. Provisional Patent Appl. Ser. No. 63/505,751, filed on Jun. 2, 2023, which is incorporated herein by reference in its entirety.

FIELD OF INVENTION

The present invention relates to an apparatus for animal training, rehabilitation, and recreation, and more particularly, the present invention relates to an apparatus having a multiple-point suspension pendulum platform for animal training, rehabilitation, and recreation.

BACKGROUND

Exercising apparatuses are used widely for the exercise, training, and rehabilitation needs of people. Exercising apparatus provides several advantages, such as counter resistance for training muscles. Exercising apparatus also helps build coordinatization and balancing skills. Like humans, pets also can benefit from exercising apparatuses. For example, certain exercise apparatus is used for rats for both physical activity as well as recreational activities. Treadmill-like equipment is available for dogs and cats.

A need is appreciated for an improved apparatus for animal training, rehabilitation, and recreation.

SUMMARY OF THE INVENTION

The following presents a simplified summary of one or more embodiments of the present invention to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to an apparatus for animal training, rehabilitation, and recreation.

Another object of the present invention is that the apparatus provides oscillational reactions to animal's energy/movement input.

Still another object of the present invention is that the apparatus can be used for post-trauma physical therapy, rehabilitation, and recreation.

Yet another object of the present invention is that the apparatus can be used for an animal's physical & core strengthening, balancing, stabilization, body awareness, confidence building, and animal and handler bonding.

A further object of the present invention is that the apparatus is designed to and focuses on the beneficial, therapeutic, and dynamic reactive and corrective movements the subject animal experiences, and benefits from, in their constant required efforts to balance themselves and stabilize the multi-point suspended pendulum platform of the apparatus.

In one aspect, disclosed is an apparatus for animal post-trauma physical therapy, rehabilitation, balance, body & mind conditioning, and recreation. The disclosed apparatus allows for the simultaneous building of confidence in animals and building the handler/animal bonding. The disclosed apparatus includes a multi-point suspended pendulum platform over which an animal, such as a dog, can stand for exercise. The platform can oscillate in response to the movements of the animal on the platform. The oscillatory movement of the suspended platform is a critical feature of the present invention that allows for dynamic physical therapy overcoming the drawbacks of conventional exercise equipment. The unique oscillating effects & dynamic reactive characteristics of the multi-point suspended pendulum platform are therapeutically beneficial and enhance the subject animals' physical therapy, rehab, and/or recreation time.

BRIEF DESCRIPTION OF DRAWINGS

The accompanying figures, which are incorporated herein, form part of the specification and illustrate embodiments of the present invention. Together with the description, the figures further explain the principles of the present invention and enable a person skilled in the relevant arts to make and use the invention.

DETAILED DESCRIPTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is to describe particular embodiments only and is not intended to be limiting to embodiments of the invention. As used herein, the singular forms "a", "an" and "the" are intended to include the plural forms as well, unless the context indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely to illustrate the general principles of the invention since the scope of the invention will be best defined by the allowed claims of any resulting patent.

Figure 1:
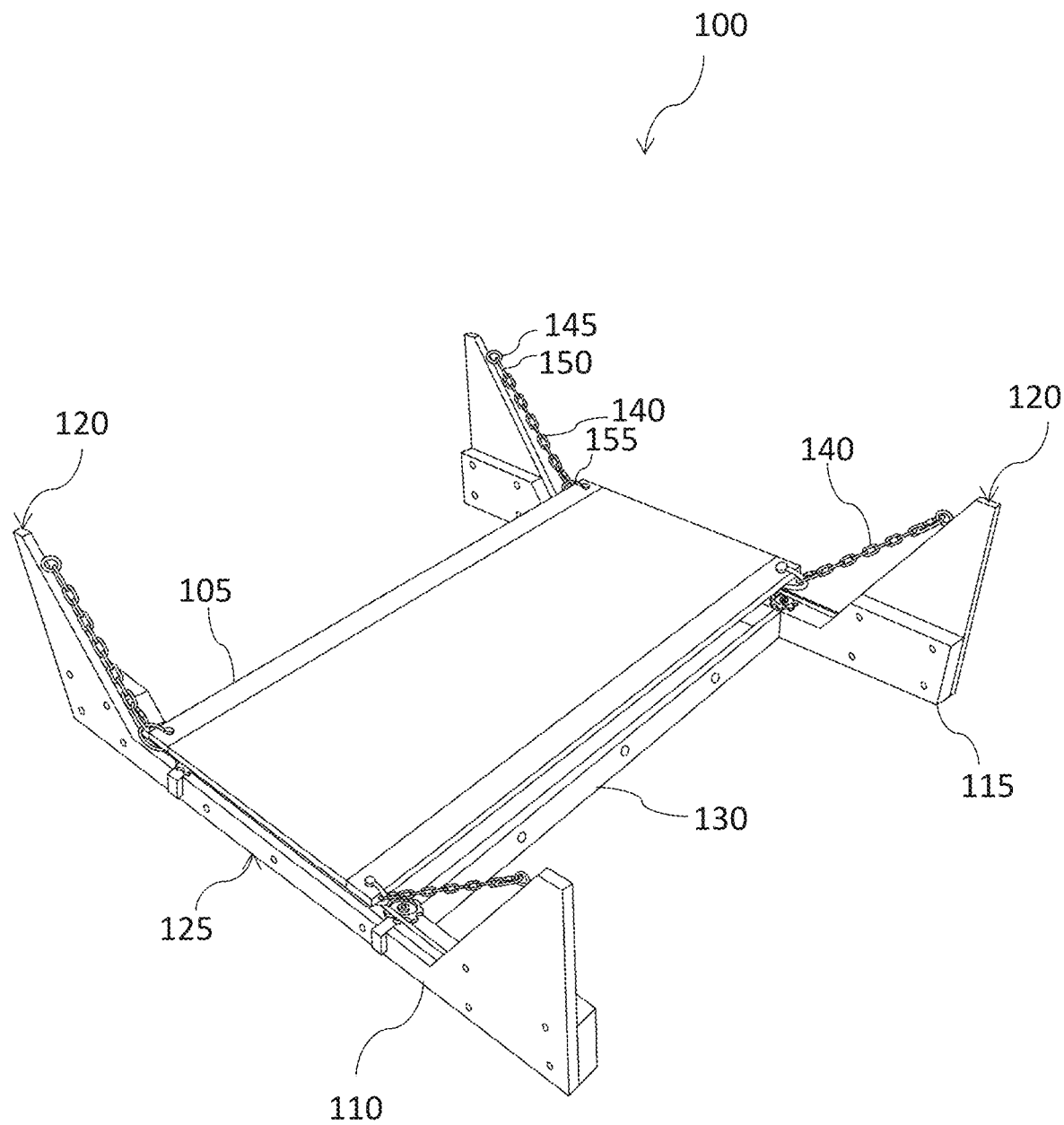
FIG. 1 is a perspective view of the apparatus, according to an exemplary embodiment of the present invention.
Figure 2:
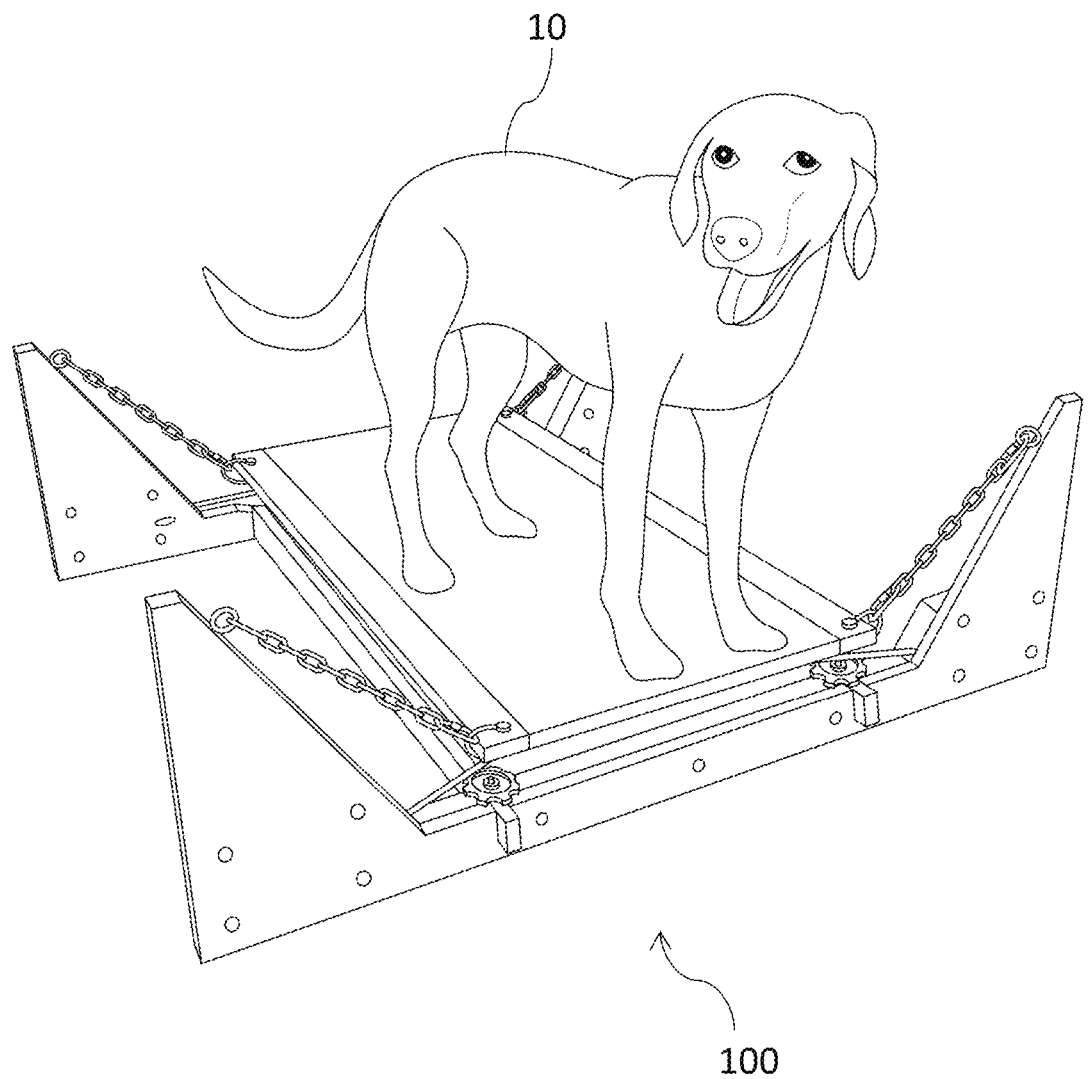
FIG. 2 shows a dog on a platform of the apparatus, according to an exemplary embodiment of the present invention.
Figure 3:
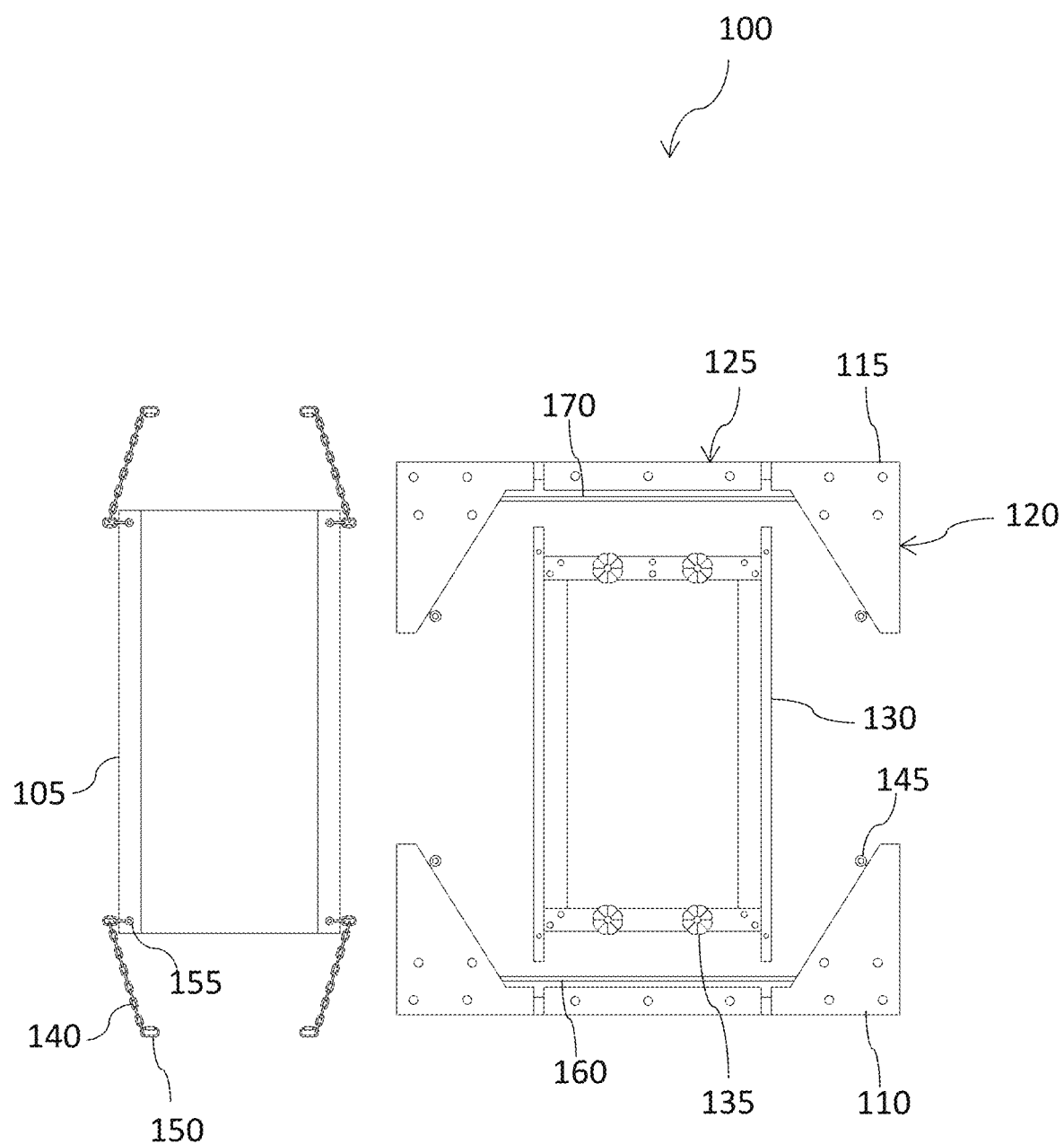
FIG. 3 shows an exploded view of the apparatus, according to an exemplary embodiment of the present invention.

The described invention pertains to an apparatus for animal, quadruped, and amputee training, rehabilitation, and recreation. Referring to FIG. 1 shows a perspective view of the apparatus 100 and FIG. 2 shows a dog 10 standing on the platform 105 of the apparatus 100. The apparatus 100 includes a platform 105 of an elongated profile having a proximal end and a distal end. As shown in the drawing, platform 105 can be rectangular. The drawings show corners; however, the platform can be of any other suitable shape, and any variations in the shape of the platform are within the scope of the present invention. For example, the shape can be varied to rectangular with rounded corners, circular, and the like. Moreover, the shape can be symmetrical or asymmetrical. Platform 105 can be suspended by two bridge pivot towers. Apparatus 100 includes a proximal bridge pivot tower 110 and a distal bridge pivot tower 115, wherein the proximal end of the platform is suspended by the proximal bridge pivot tower 110 and the distal end is suspended by the distal bridge pivot tower 115. Each of the bridge pivot towers includes two towers 120 at the ends of a horizontal bar 125. A stabilizing frame 130 extends between the proximal bridge pivot tower 110 and the distal bridge pivot tower 115. The stabilizing frame 130 is more clearly shown in FIG. 3, which is an exploded view. The stabilizing frame 130 includes a rectangular frame having a pair of horizontal bars that extend along the left side and the right side of the rectangular frame. As shown in the drawing, the stabilizing frame 130 can be of rectangular shape, however; it is to be noted the stabilizing frame 130 can also be of square or triangular shapes. The pair of horizontal bars 125 can be coupled to the proximal bridge pivot tower 110 and the distal bridge pivot tower 115 to provide structural integrity, support, and durability to the apparatus 100. A quick disconnect fastener knob 135 can be used to secure the stabilizing frame 130 to the two bridge pivot towers 110 & 115. The quick disconnect fastener knobs 135 allow quick disassembly and assembly of the apparatus 100.

From each of the two bridge pivot towers 110 & 115, a suspension member 140 extends and couple to the platform 105 at opposite ends for suspending the platform 105. It is to be noted that the drawings show chains, however, any other suitable cord, strap, rod, rope, and load-bearing sensors are within the scope of the invention. For example, cords made with polymeric materials can be used. It is also to be noted; The drawings show two suspension members 140 for each bridge pivot tower 110 & 115; however, any plurality of suspension members 140 can be used. The chains suspension members 140 can attach to the tower using an eye hook 145. For example, each of the four towers in FIG. 1 has four eye hooks 145 coupled to near the top of the towers. Suspension members 140 can extend from these eye hooks 145. The suspension members 140 can connect to the eye hooks 145 through quick connect/disconnect links 150. It is to be noted that the length of each of the suspension member 140 is independently adjustable. To the corners of the platform, are coupled with an Omni-Directional, free-floating connector 155. Thus, platform 105 can be movably suspended from the four corners by the four towers like a pendulum.

Figure 4:
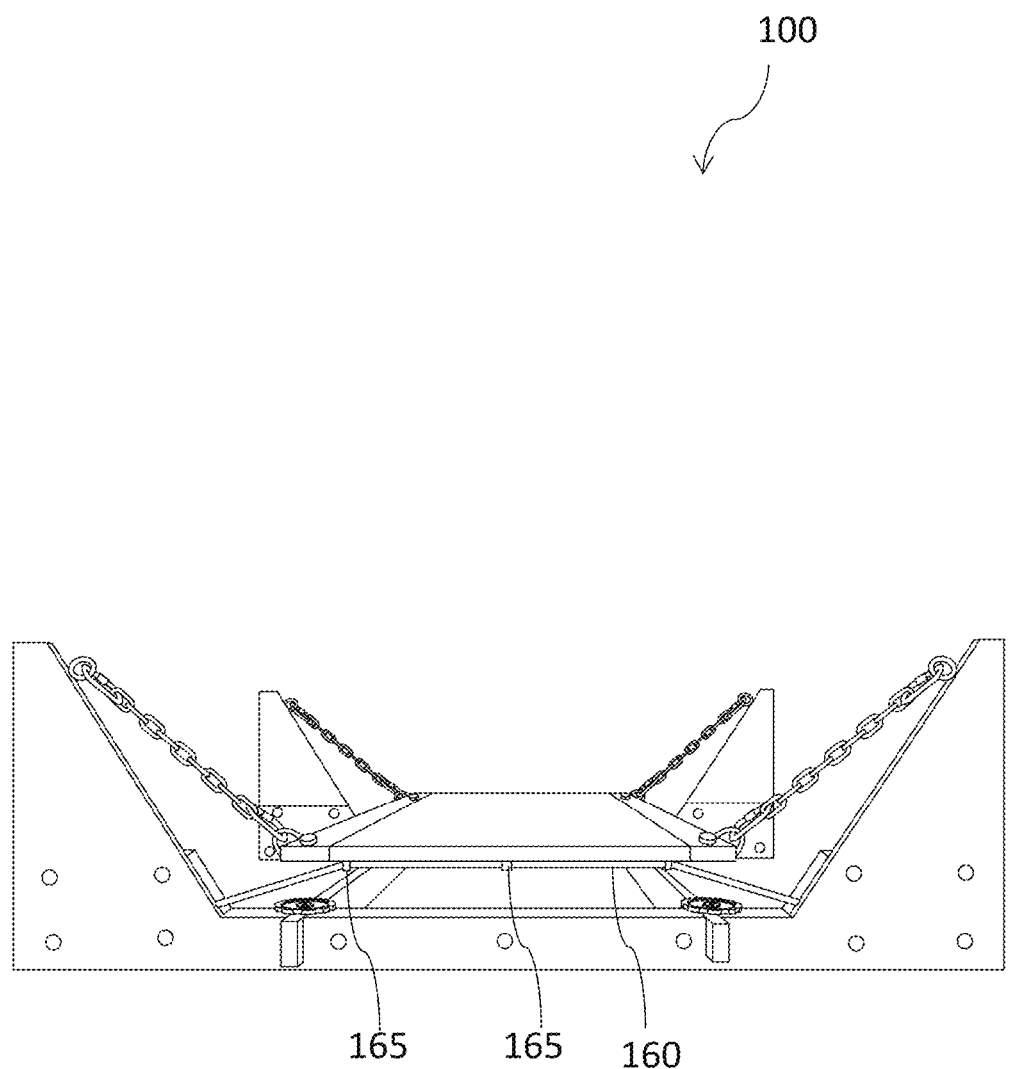
FIG. 4 shows a front-end view of the apparatus, according to an exemplary embodiment of the present invention.
Figure 5:
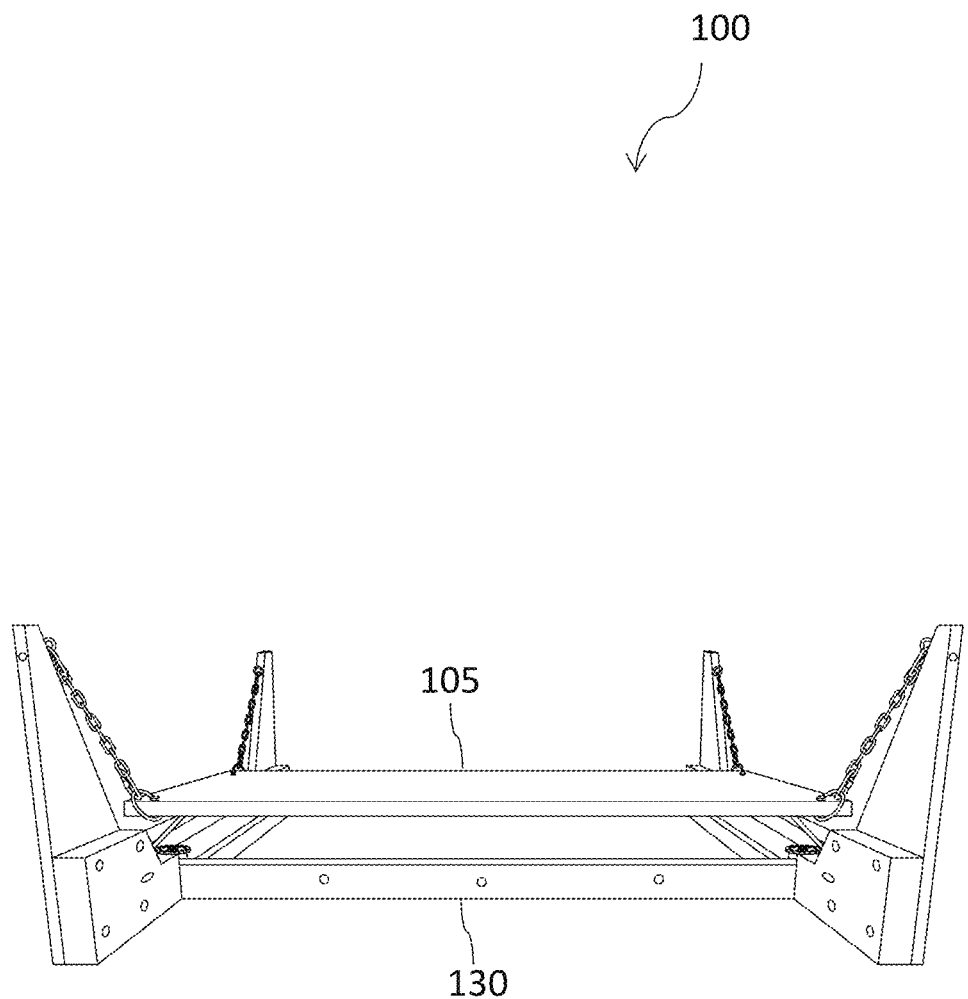
FIG. 5 shows a side view of the apparatus, according to an exemplary embodiment of the present invention.
Figure 6:
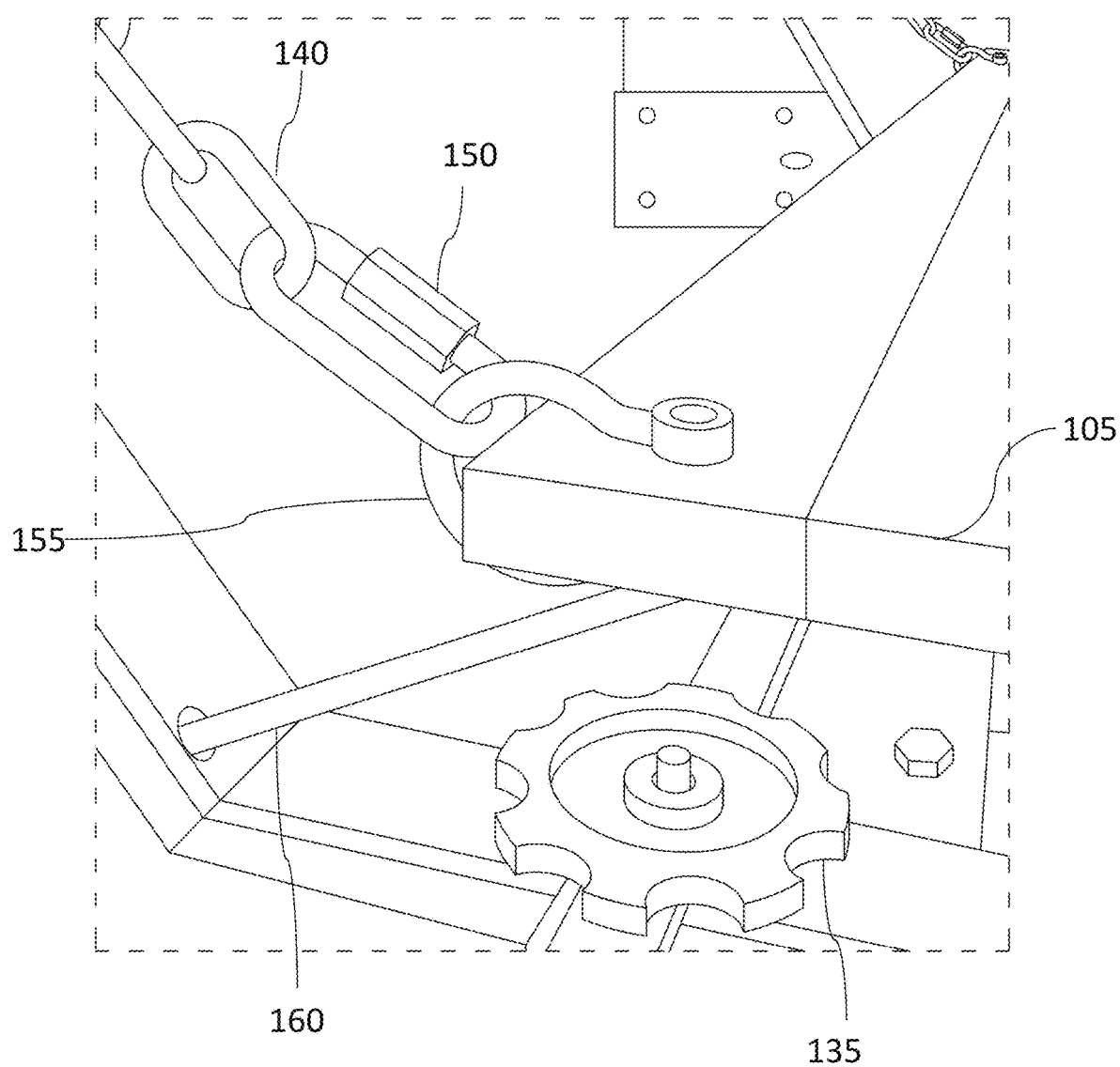
FIG. 6 shows an enlarged view of a corner of the apparatus, according to an exemplary embodiment of the present invention.

The movement of the platform 105 i.e., the oscillation can be further controlled using springs, magnets, and elastic or bungee-type dampers. FIG. 4, which is a front view shows an oscillation damper 160 that extends between the two towers of the proximal bridge pivot towers 110. The oscillation damper 160 can also be seen in FIG. 3, and the same can be provided for both the proximal and distal bridge pivot towers 110 & 115. The proximal and distal end portions of the platform 105, at their bottom side, near the edges, can be provided with hooks 165. The oscillation damper 160 can be hooked to one or more of these hooks 165. The proximal oscillation damper 160 can hook to the proximal end portion of the platform and a distal oscillation damper 170 can be hooked to the distal end portion of the platform 105. At least one hook 165 can be provided on both the proximal and distal end portions of the platform 105. More than one hook 165 can be provided for increased tension within the oscillation damper 160 and provide more stability to the platform 105. For example, three equally spaced hooks 165 can be provided on the proximal end portion of the platform and three equally spaced hooks can be provided on the distal end portion of the platform 105. FIG. 4 shows the proximal end portion having three hooks 165.

In certain implementations, the top of the platform 105 can have a non-slip layer, such as a textured surface that may ensure non-slip, solid, and stabilized footing. The bottom of the bridged towers can be provided with rubber foot pads to ensure stability on the floor as well as to reduce any vibrations. Moreover, the rubber foot pads may ensure that the apparatus 100 remains stationary on the floor.

In certain implementations, the platform 105 can be suspended by links that can easily disconnect, which makes both assembling and disassembly easier and quicker. This may allow easier and quicker disassembly of the apparatus 100 for stowing the same and saving floor space.

In use, the apparatus 100 can be assembled according to the needs of the user. First, the oscillation dampers can be set for the desired tension. For example, the oscillation damper can be hooked to only a central hook for more mobility of the platform, lesser tension, and greater oscillation. For less mobility of the platform, the tension can be increased by employing two or more hooks 165 for the oscillation damper. The same can be done for the distal oscillation damper 170, Once set, as shown in FIG. 1, the dog in this example can be made to stand on the platform and guided for the prescribed exercises or physical therapy.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. An apparatus for animal training, rehabilitation, and/or recreation, the apparatus comprises:

a platform having a proximal end and a distal end;

a proximal bridge tower, wherein the proximal bridge tower has a left tower and a right tower, wherein the platform at its proximal end is suspended from the left tower and the right tower of the proximal bridge tower;

a distal bridge tower, wherein the distal bridge tower has a left tower and a right tower, wherein the platform at its distal end is suspended from the left tower and the right tower of the distal bridge tower;

a proximal oscillation damper configured to couple to the proximal end of the platform, the proximal oscillation damper configured to impart elastic resistance to movement of the platform; and a distal oscillation damper configured to couple to the distal end of the platform, the distal oscillation damper configured to impart elastic resistance to movement of the platform, wherein the elastic resistance reduces the oscillatory movement of the platform suspended from the proximal and distal bridge towers.

2. The apparatus of claim 1, wherein each of the proximal and distal oscillation dampers are elastic cords, wherein the elastic cords are configured to hook to the respective proximal end and the distal end of the platform.

3. The apparatus of claim 1, wherein the apparatus further comprises a stabilizing frame that extends between and supports the proximal bridge tower and the distal bridge tower.

4. The apparatus of claim 1, wherein the platform is suspended through four chains from the four towers of the proximal and distal bridge towers.

5. The apparatus of claim 4, wherein each of the four chains is attached to the respective tower using a quick-release link.

6. A method for animal training, rehabilitation, and/or recreation, the method comprises:

installing an apparatus comprising:
   a platform having a proximal end and a distal end,
   a proximal bridge tower, wherein the proximal bridge tower has a left tower and a right tower, wherein the platform at its proximal end is suspended from the left tower and the right tower of the proximal bridge tower,
   a distal bridge tower, wherein the distal bridge tower has a left tower and a right tower, wherein the platform at its distal end is suspended from the left tower and the right tower of the distal bridge tower,
   a proximal oscillation damper configured to couple to the proximal end of the platform, the proximal oscillation damper configured to impart elastic resistance to movement of the platform, and
   a distal oscillation damper configured to couple to the distal end of the platform, the distal oscillation damper configured to impart elastic resistance to movement of the platform, wherein the elastic resistance results in oscillatory restriction of the platform suspended from the proximal and distal bridge towers;

adjusting tension in the proximal and distal oscillation dampers; and putting an animal on the platform.

7. The method of claim 6, wherein each of the proximal and distal oscillation dampers are elastic cords, wherein the elastic cords are configured to hook to the respective proximal end and the distal end of the platform.

8. The method of claim 6, wherein the apparatus further comprises a stabilizing frame that extends between and supports the proximal bridge tower and the distal bridge tower.

9. The method of claim 6, wherein the platform is suspended through four chains from the four towers of the proximal and distal bridge towers.

10. The method of claim 9, wherein each of the four chains is attached to the respective tower using a quick-release link.

11. The method of claim 6, wherein the animal is a dog.

* * * * *